United States Patent
Cecil

(10) Patent No.: US 9,461,839 B2
(45) Date of Patent: Oct. 4, 2016

(54) NETWORK STATUS VISUALIZATION SYSTEMS AND METHODS

(71) Applicant: Ciena Corporation, Hanover, MD (US)

(72) Inventor: Allan Lee Cecil, Petaluma, CA (US)

(73) Assignee: Ciena Corporation, Hanover, MD (US)

( * ) Notice: Subject to any disclaimer, the term of this patent is extended or adjusted under 35 U.S.C. 154(b) by 157 days.

(21) Appl. No.: 14/036,888

(22) Filed: Sep. 25, 2013

(65) Prior Publication Data

US 2015/0085641 A1 Mar. 26, 2015

(51) Int. Cl.
*H04L 12/437* (2006.01)
*H04L 12/24* (2006.01)

(52) U.S. Cl.
CPC ......... *H04L 12/437* (2013.01); *H04L 41/0663* (2013.01); *H04L 41/12* (2013.01); *H04L 41/22* (2013.01)

(58) Field of Classification Search
CPC ............. H04L 41/0654; H04L 12/437; H04L 41/0663; H04L 41/22; H04L 41/12
See application file for complete search history.

(56) References Cited

U.S. PATENT DOCUMENTS

| | | |
|---|---|---|
| 5,999,288 A | 12/1999 | Ellinas |
| 6,498,778 B1 * | 12/2002 | Cwilich .............. H04L 41/0654 370/216 |
| 6,826,607 B1 | 11/2004 | Gelvin |
| 2002/0064166 A1 * | 5/2002 | Suetsugu et al. ............. 370/403 |
| 2003/0051195 A1 | 3/2003 | Bosa |
| 2005/0097108 A1 | 5/2005 | Wang |
| 2007/0147269 A1 | 6/2007 | Ettle |
| 2009/0157853 A1 * | 6/2009 | Doi ................... G06F 17/30241 709/220 |
| 2012/0243405 A1 | 9/2012 | Holness |
| 2013/0003530 A1 | 1/2013 | Davari |
| 2014/0016923 A1 * | 1/2014 | Fernandez-Palacios et al. 398/2 |

FOREIGN PATENT DOCUMENTS

WO WO 01/97466 12/2001

OTHER PUBLICATIONS

ITU-T G.8032/Y.1344 Ethernet ring protection switching, Feb. 2012.*

* cited by examiner

*Primary Examiner* — Kwang B Yao
*Assistant Examiner* — Moo Ryong Jeong
(74) *Attorney, Agent, or Firm* — Clements Bernard PLLC; Christopher L. Bernard; Lawrence A. Baratta, Jr.

(57) ABSTRACT

Systems and methods visualize a point to multi-point network, such as a network including Ethernet Ring Protection (ERP) using a visualization techniques used for point-to-point networks. For example, for a selected start and end node, intervening nodes may be identified and any protection rings also identified. A blocking port for each ring is identified and based thereon a path through the ring is identified. A trail between the start and end node is then generated using the current path through the protection rings. The trail may then be represented graphically. Unblocking of a blocked port of a ring may be detected and a new path through the ring may be determined and represented graphically. Status indicators may be included in the updated representation of the ring to indicate the presence of a failure condition.

20 Claims, 14 Drawing Sheets

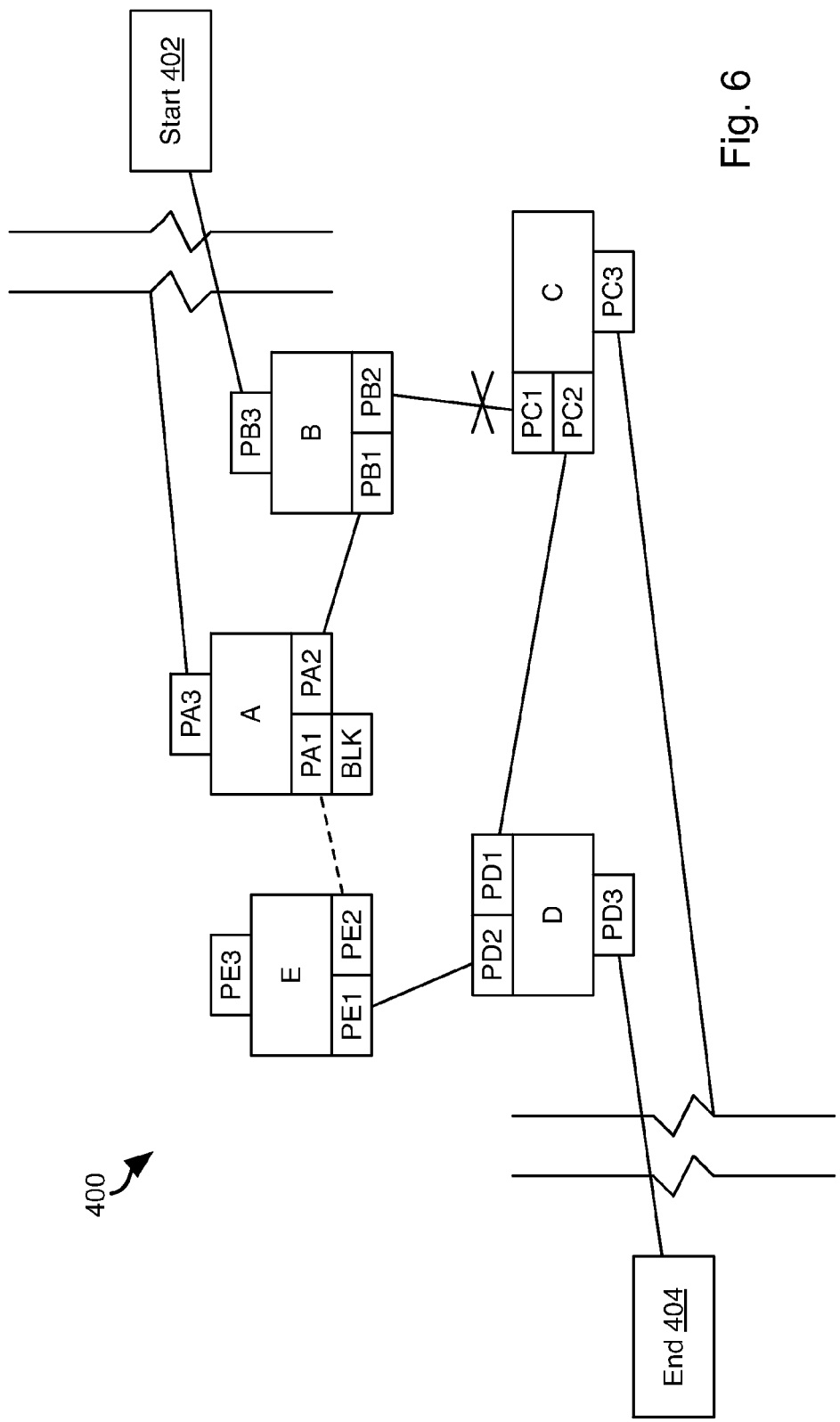

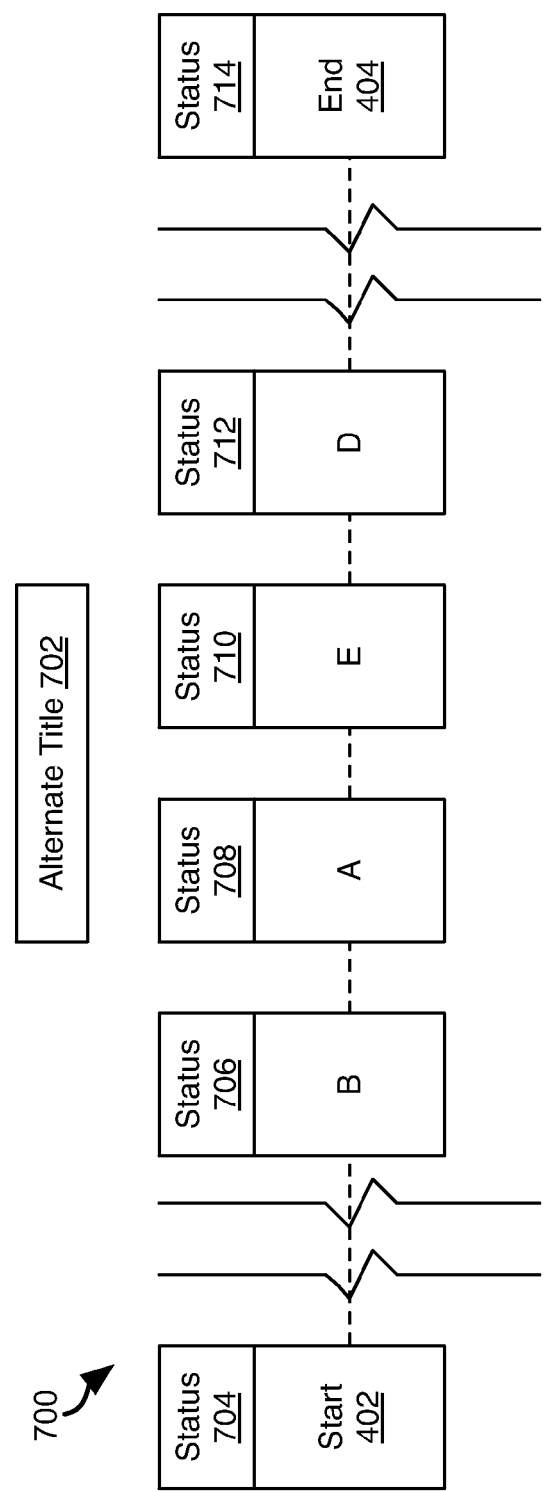

NETWORK STATUS VISUALIZATION SYSTEMS AND METHODS

TECHNICAL FIELD

The present disclosure relates to systems and methods for generating a graphical representation of the nodes and status of nodes of a network.

BACKGROUND

In many network implementations, Ethernet Ring Protection Switching (ERPS) is used to provide a robust connection between two points. A ring may be embodied as at least two nodes such that each node includes at least two independent ports connected to neighboring nodes of the ring. In advance of any failures, one link of the ring is provisioned as the Ring Protection Link (RPL) and one port on that link is provisioned as the RPL Owner. In operation, the blocking port sends a Continuity Check Message around the ring back to itself, or alternately relies on what are called APS messages from neighboring nodes to detect a failure elsewhere on the ring. In either case, when the RPL owner detects that the rest of the ring is not healthy because another link on the ring is blocked, the RPL owner responds by unblocking the RPL and allowing traffic through (usually within 50 ms). For example, in an optical network a failure condition may occur because two ports of two other nodes detect that light between them has been disrupted due to a fiber cut and both of those ports will enter a blocked state pointing at one another. In other cases, the failure could be due to a hardware failure on one end of a connection between two nodes of the ring. When the error condition is resolved, the RPL Owner will detect that the ring is healthy and will start a Wait To Restore (WTR) countdown. When the WTR expires (usually after counting down for 5 minutes), the RPL owner will block the RPL and the nodes adjacent to the previously broken link will unblock.

An ERPS may be very complex and many rings may implement a connection between any two nodes of a network. Accordingly, visualizing a connection between any two nodes may be very complex inasmuch as there are multiple possible paths. Tools have been used to visualize point-to-point connections, such as trail analyzers. However, these tools do not have the capability to provide the same convenience and ease of representation for portions of networks including an ERPS.

The systems and methods described herein provide an improved approach for visualizing networks including an ERPS.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is a schematic block diagram of a network including a protection ring that is experiencing an error condition that may be visualized in accordance with an embodiment of the invention;

FIGS. 7A and 7B are representations of the network of FIG. 6 generated in accordance with an embodiment of the invention;

DETAILED DESCRIPTION

Figure 1A:
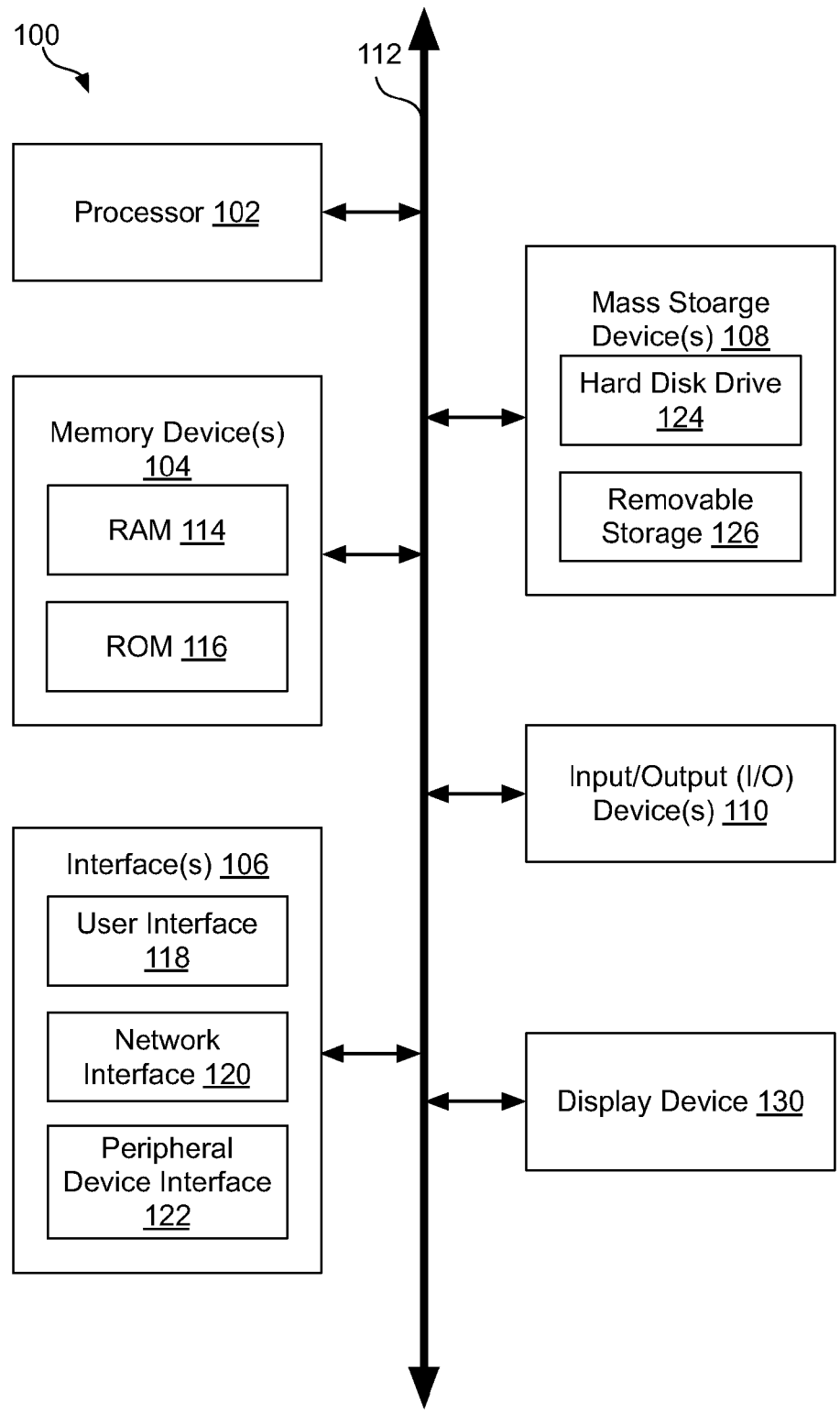
FIGS. 1A and 1B are a schematic block diagrams of computer systems suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for visualizing a network including one or more ERP rings.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1A is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 1B:
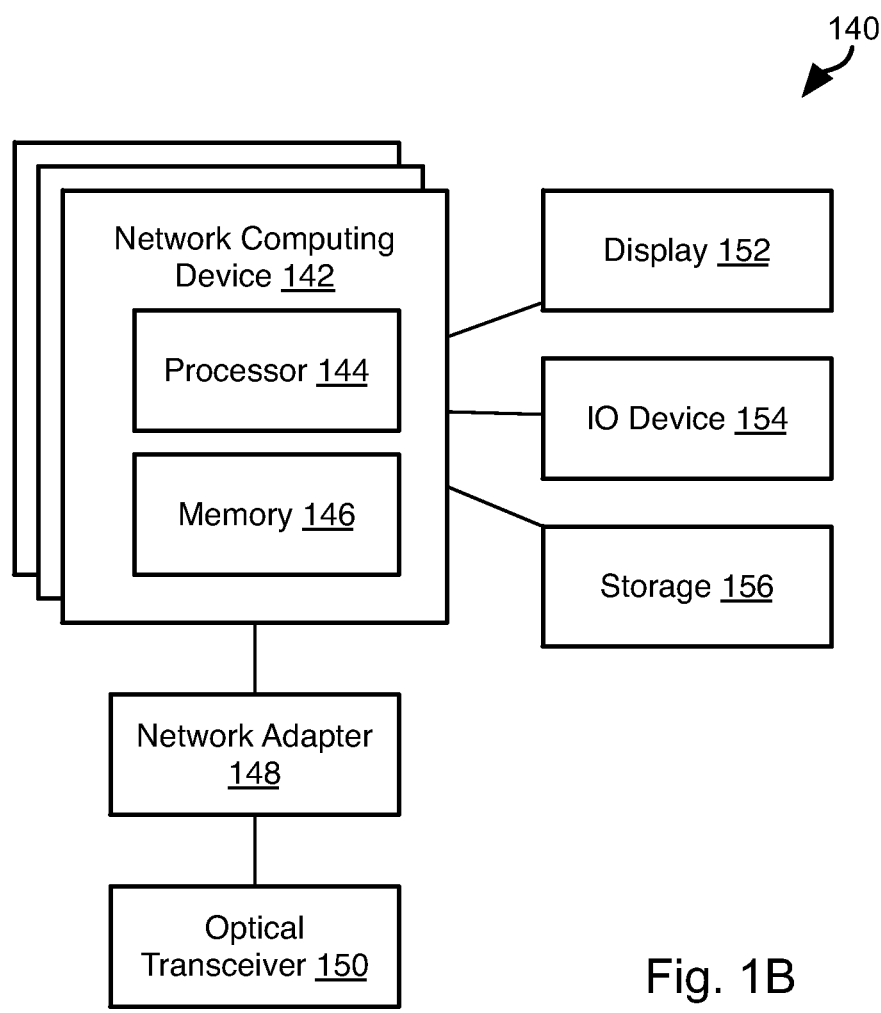

Referring to FIG. 1B, the illustrated computing device 140 may form a node of a network analyzed according to methods disclosed herein. The illustrated device 140 may also perform the visualization methods disclosed herein. The computing device 14 may include one or more network computing devices 142, each of which may include a processor 144 and memory 146 (e.g. RAM). The network computing devices 142 may be any dedicated networking device such as a router, switch, or other networking utility. The networking computing devices 142 may be coupled to one another and/or to a network adapter 146. The network adapter 146 may be coupled to wire lines or to an optical transceiver 150 coupled to an optical network. The network adapter 148 may also implement wireless connections to other devices. The networking computing devices 142 may include multiple slots and may define multiple physical and/or logical ports.

In many instances, a computing device 140 functions as part of the backbone of a network and may omit peripheral devices used to access the computing device 100 and may instead be accessed remotely from a remote terminal. In some embodiments, the computing device 140 may have coupled thereto such peripheral devices as a display device 152, input/output (IO) device 154 (e.g. keyboard, touch screen, trackpad, mouse), and a storage device 156 (e.g. hard drive).

For purposes of illustration, programs and other executable program components are shown herein as discrete blocks, although it is understood that such programs and components may reside at various times in different storage components of computing device 100, and are executed by a processor. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
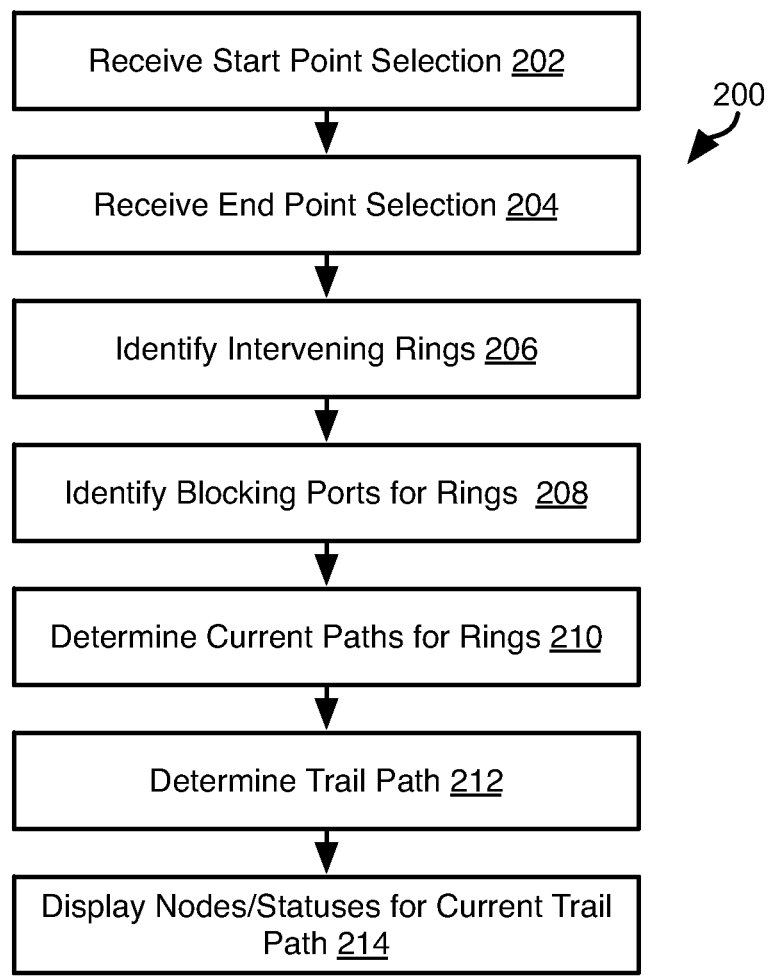
FIG. 2 is a process flow diagram of a method for visualizing a network in accordance with an embodiment of the invention.

FIG. 2 illustrates a method 200 for representing a network including Ethernet Ring Protection (ERP), or other similar ring redundancy. The method 200 may be executed by a node of the network with respect to which the method 200 is executed or some other computing device accessing data concerning operation of the network. The method 200 may include receiving 202 a selection of a starting point and receiving 204 a selection of an ending point. The starting and ending points may be specific ports of nodes in the network. The ports may belong to nodes of the network (network to network interfaces (NNI) or to a client node (user-to-network interface (UNI)). The selection may be received by receiving input of a textual description of the starting and ending point. The selection may also be received by receiving interaction with a representation of the starting and ending point in a user interface displaying a representation of the network. For purposes of this application, the starting and ending point preferably have intervening nodes connecting the starting and ending point and the intervening nodes preferably include one or more protection rings.

Although the methods disclosed herein are described with reference to ERP, any point-to-multi-point network may be advantageously be visualized using the methods disclosed herein. Accordingly, when start and endpoints are known for a network including any number of branches, the intervening nodes between the start and end points may be visualized using the methods described herein.

The method 200 may further include identifying 206 one or more rings among the intervening nodes connecting the starting and ending points. A ring may be identified based on topology (e.g. two or more nodes connected to form a ring) and/or from examining one or more configuration files or environmental variables defining the configuration of the network. In yet another alternative, a ring may be determined from network traffic, e.g. detecting Continuity Check Messages transmitted by the RPL owner node of a ring. The method 200 may further include identifying 208 one or both of a blocking port and an RPL for each of the identified intervening rings. Identifying the blocking port and/or RPL for each ring may be performed in the same manner as for step 206, e.g. evaluating topology, traffic, configuration files and parameters, or the like.

Using the topology of the identified intervening rings and the identified blocking port and/or RPL, a path through each of the identified intervening rings may be determined 210. For example, using the network topology including the starting and ending points a path connecting the starting points may be identified such that, for a given ring, a path between the starting and ending points that both passes through the ring and does not include the RPL may be identified. A trail path may be determined 212 that includes the current paths identified at step 210 as well as any other nodes that, along with the identified intervening rings, define a data path between the starting and ending points.

A representation of the trail path may then be displayed 214, e.g. transmitted to a display device or display, stored for later display, or otherwise used to facilitate visualization and/or analysis of the network. The representation may include symbols representing nodes as well as connections between nodes. The representation may further include status indicators indicating the status of the nodes and/or connections between nodes.

Figure 3:
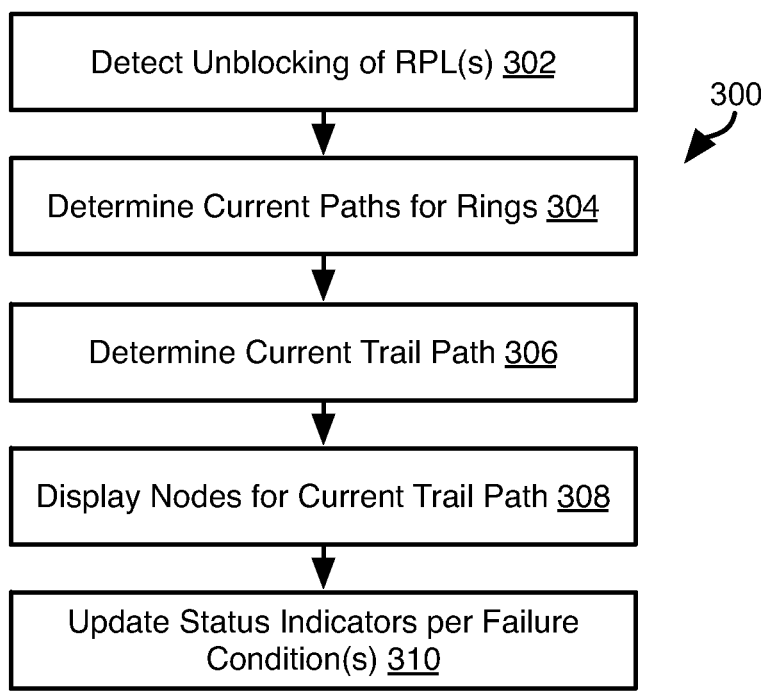
FIG. 3 is a process flow diagram of a method for updating a visualization of a network in response to an error condition in accordance with an embodiment of the invention.

Referring to FIG. 3, in response to a fault condition in any one of the identified intervening rings, the path therethrough may change. Accordingly, a method 300 may include detecting 302 unblocking of the RPL of one of the identified intervening rings. As noted above, unblocking of the RPL may be in response to the RPL owner failing to receive a Continuity Check message, which may be the result of a discontinuity in a physical cable, failure of a node of the ring, or some other cause.

Detecting unblocking may be performed by subscribing to events relating to an ERP. For example, in some instances, "events" are generated in response to changes in the network, such as unblocking of the RPL. These events may be generated by a device implicated by the event. For example, an event reporting unblocking or blocking of the RPL may be generated by the RPL owner node and broadcast over the network. One or more nodes of the network may listen for such events. In particular, a user computing device may subscribe to event by sending an instruction to a server to listen for such events and report them to the user computing device. The server will therefore detect these events when broadcast and transmit them or a representation of them to the subscribing user computing device. A user computing device executing the methods disclosed herein may then use these events to refresh a representation of a network generated according to the methods described herein. In some embodiments detecting unblocking may include periodically evaluating the network to determine that the network state has changed, e.g. the RPL has become unblocked or blocked. Explicitly evaluating the network rather than waiting for an event to indicate a change may be done in response to a user instruction, received on a user computing device, to refresh a network representation. Explicitly evaluating the network rather than waiting for an event may also be performed according to a fixed period, on startup of the user computing device, or in response to an event (e.g. network outage) that could result in missing of an event reporting a change in network state.

In response to detecting 302 unblocking of the RPL for an identified intervening ring, the method 300 may include determining 304 a current path through the identified intervening ring, e.g. a path through the ring that includes the now-unblocked RPL. The current trail path 306 between starting and end points for the current paths determined at step 304 may be determined in the same manner as for the method 200. Likewise, the nodes of the current trail path and the connections therebetween may be displayed 308, e.g. transmitted for display. Status indicators for the nodes and/or connections between nodes may also be updated to indicate any failure condition that caused the unblocking of the RPL.

The method 300 may also be repeated upon detecting re-blocking of the RPL. The method 300 would therefore include performing steps 304-310 for the ring in which re-blocking occurred using the current state of the RPL.

Figure 4:
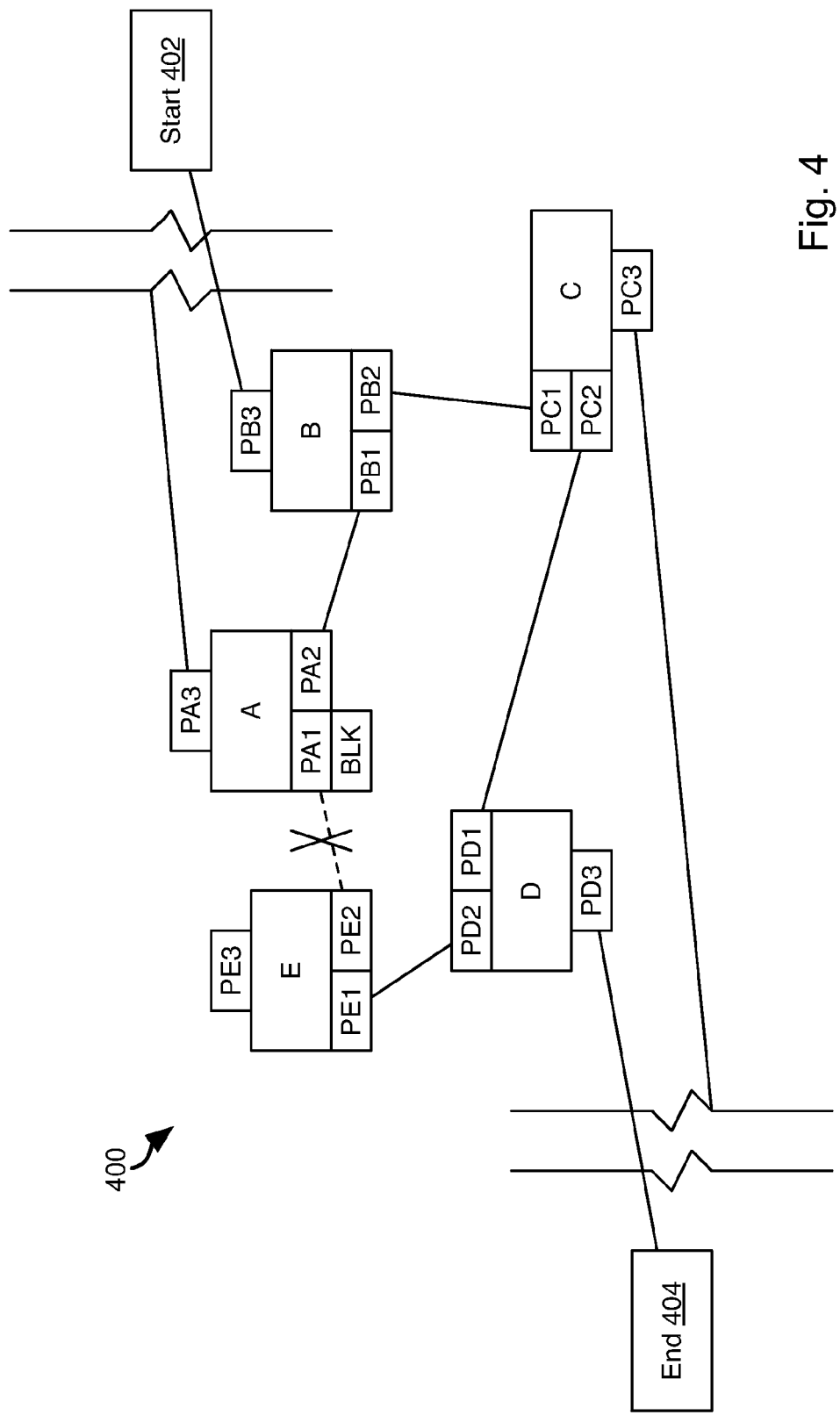
FIG. 4 is a schematic block diagram of a network including a protection ring that may be visualized in accordance with an embodiment of the invention.

FIG. 4 illustrates an example network configuration that may be visualized using the methods disclosed herein. As shown in FIG. 4, each node of the ring (A-D) has a plurality of ports (PA1-PA3, PB1-PB3, etc.). A port of each node is connected to a port of another node. Likewise, one or more ports of one or more nodes are connected to other points in the network. For example, node A has port PA3 connected to a node in some other segment and node B has a port PB3 connected, possibly by one or more intervening nodes, the starting port 402. Likewise, node C includes a port PC3 connected to a node outside of the illustrated segment and node D has a port PD3 connected, possibly by way of one or more intervening nodes, to the end port 404.

As is apparent in FIG. 4, port PA1 of node A is blocked (BLK) and the ring protection link (RPL) (shown as a dashed line) is blocked, e.g. does not allow traffic to or from port PE2 of node E. Accordingly, the path from the start port 402 to the end port 404 includes nodes B, C, and D. The path through B, A, E, and D is a secondary path and is not used for traffic from start port 402 to end port 404.

Figure 5:
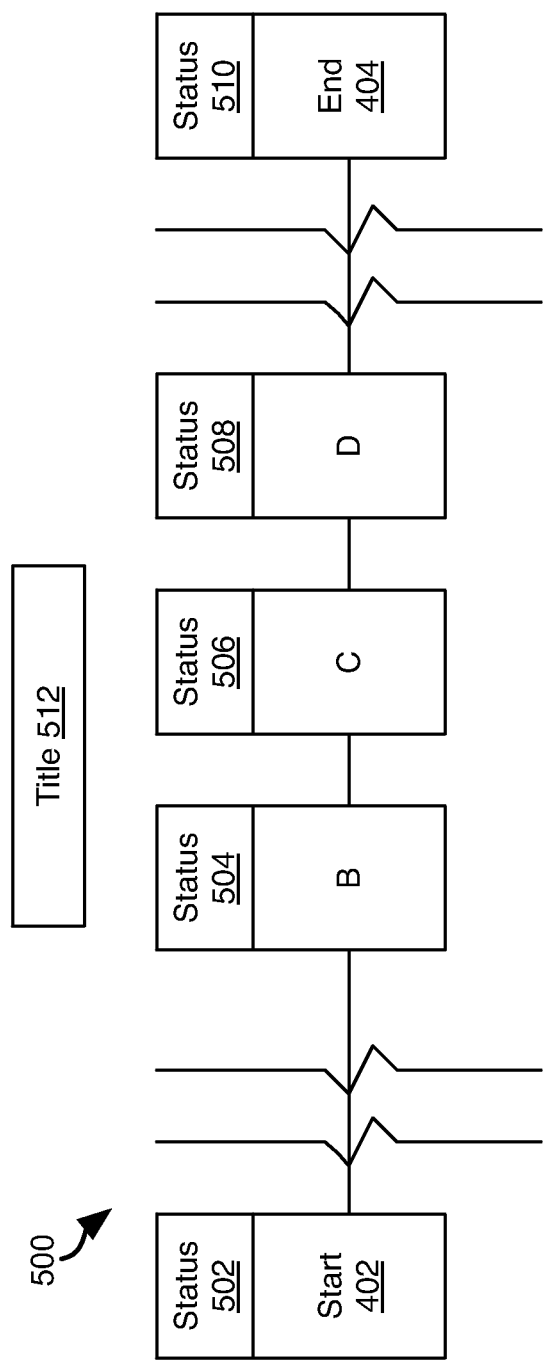
FIG. 5 is a representation of the network of FIG. 4 generated in accordance with an embodiment of the invention.

For the segment 400 of FIG. 4 in the illustrated state, a graphical representation 500 of the trail path between the start port 402 and end port 404 may be as shown in FIG. 5. A representation of the start port 402, and a representation of the end port 404, e.g. representation of a nodes hosting the start port 402 and the ports themselves, may be shown. Likewise, representations of the nodes B, C, D that are included in the trail path are shown based on the current state of the ring in which they are included. Likewise, connections, and/or the status of connections, between the nodes in the trail path may also be shown. Any other nodes between the start port 402 and the protection ring and between the end port 404 and the protection ring may also be shown. The nodes for the trail path may also include graphical status indicators 502-510 associated therewith that indicate the current state of the node. For example, where there are no issues or malfunctions with any part of a node, then the status indicators may indicate this textually, symbolically (e.g. a green dot), or by some other visual indicator. Likewise, if some part of a node is malfunctioning, e.g. a specific port, then the status indicator may indicate the same by means of text, symbol (e.g., red dot), or some other visual indicator. A title 512 may be displayed as part of the representation 500 and indicate the state of the ring shown. For example, where the ring has no malfunction, the title may indicate that a primary path or state of the ring is in effect.

As noted above, only one path through one ring is shown in FIG. 5. However, where other rings may form part of the trail path between the start port 402 and end port 404, similar representations of a path through these rings may be shown. Each representation may include its own title 512 as well as status indicators 504-508 for the nodes thereof.

FIG. 6 illustrates the segment 400 in which a failure condition exists. For example, the connection between nodes B and C may malfunction, such as due to severing of a cable or a malfunction of software or hardware implementing node B or C. Accordingly, the RPL owner (node A) may detect failure of the connection between nodes B and C, such as by detecting failure to receive a Continuity Check message. In response, node A may unblock the blocking port (PA1) and thereby allow traffic between nodes A and E. Accordingly, the path between the start port 402 and end port 404 will include nodes B, A, E, and D.

Referring to FIG. 7A, an updated representation 700 of the segment 400 in the state shown in FIG. 6. As shown, the trail path between start port 402 and end port 402 now includes representations of nodes B, A, E, and D. As a result of the failure condition the representation 700 may include an alternate title 702 that indicates that the representation of the ring is a secondary configuration or otherwise the result of a fault. Likewise, the representations of the start and end ports 402, 404 and the nodes B, A, E, D may be accompanied by status indicators 704-714 that indicate whether any fault is attributable to any of these nodes. In some embodiments, the connections between the nodes may also indicate the fault condition or that the represented path is the secondary path, as shown by the dotted representations of the connections between nodes in FIG. 7. Any visual or textual means may be used to visually distinguish the connections.

Figure 7B:
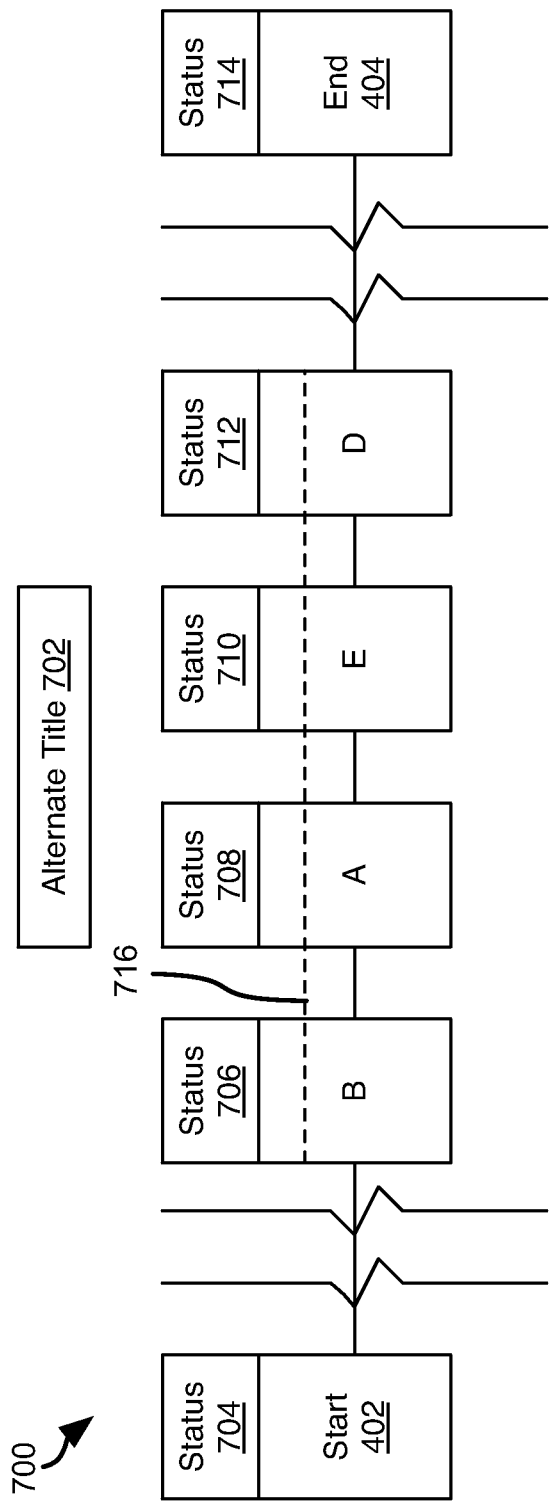

Referring to FIG. 7B, in some embodiments, a line 716 or other visual indicator will represent the ERP connection between the start port 402 and end port 404 or at least spanning the segment of the trail path between them corresponding to the ring. That is to say, a connection between components may exist at various levels of a protocol stack that may be represented generally by the OSI model (physical, data link, network, transport, session, presentation, application) and specifically by any networking protocol known in the art. In some embodiments, only protocols corresponding to some or all of the physical, data link, and transport layers are represented. The ERP connection may represent a protocol layer and the line 716 may indicate a status of the connection between start and end nodes of a path spanning a ring, e.g. spanning between nodes B and D. For example, a line type (e.g. solid or dashed), color (green or red), or other visual indicator may indicate whether the ERP connection corresponds to a primary path or a secondary path. As shown in FIG. 7B other lines may represent specific connections and the status of connections between adjacent nodes in the trail path.

Figure 8:
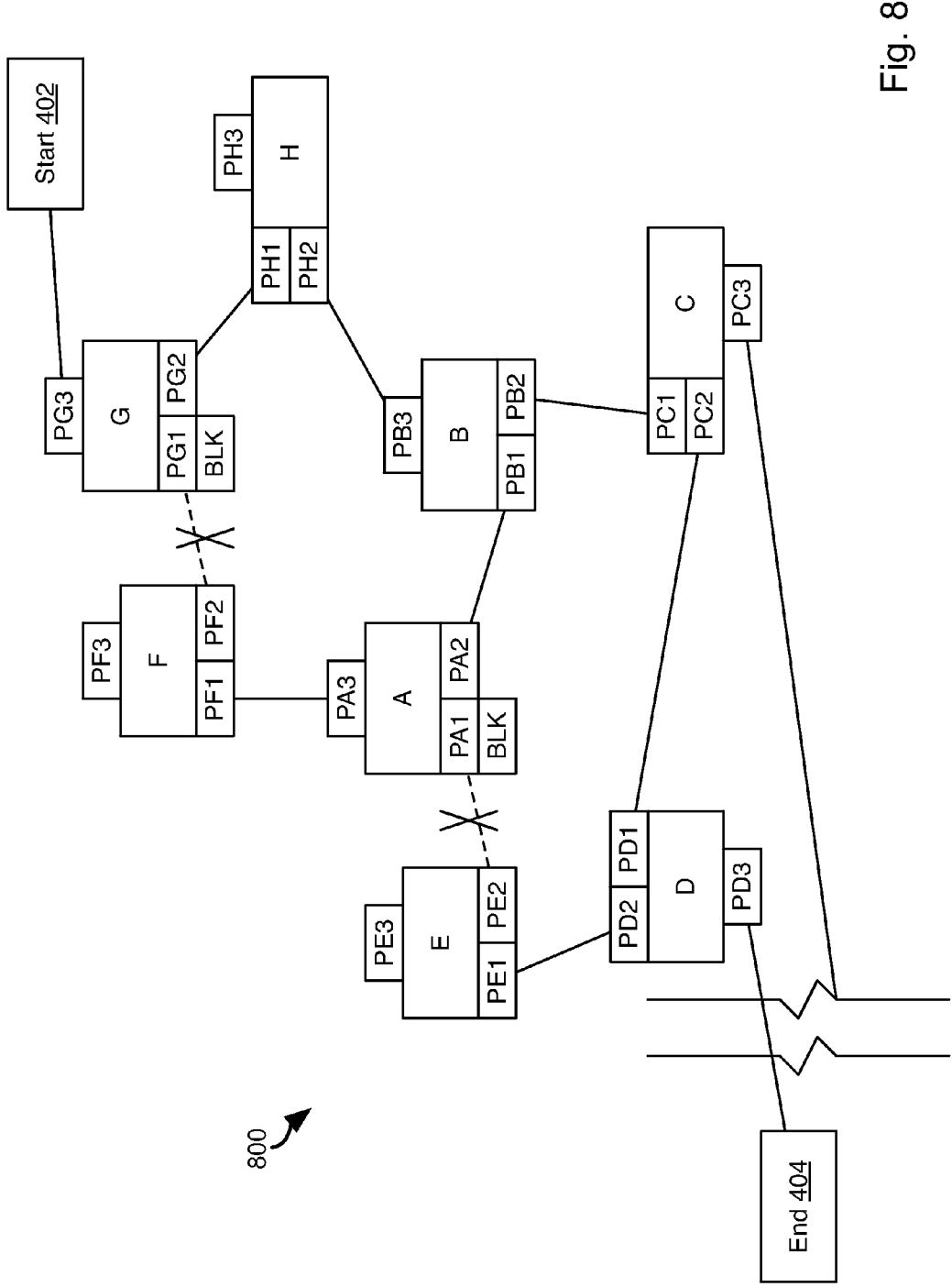
FIG. 8 is a schematic block diagram of a network including multiple protection rings that may be visualized in accordance with an embodiment of the invention.

Referring to FIG. 8, as noted above, a network 800 may include multiple rings and a path between a start port 402 and end port 404 may include multiple rings. For example, as shown in FIG. 8, a first ring composed of nodes A-E may be coupled to a subring composed of nodes F-H. The subring becomes a complete ring when connected to nodes A and B as shown. The subring may define a blocking port (PG1) and a corresponding RPL coupled thereto. Accordingly, in the illustrated configuration, a trail path between the start port 402 and end port 404 may include nodes G, H, B, C, and D. A representation of this path may be generated in the same manner as for the other network configurations described hereinabove.

Various events may change the path between the start port 402 and end port 404. For example, if the connection between B and H was lost, the new path would be G, F, A, B, C, D as node G opens the RPL of the subring. If the connection between D and C, for example, were also lost, the new path could be G, F, A, E, D as node A opens the RPL for its ring. An indefinite number of rings and subrings may form a path and a change in any of these rings may modify the path between the start port 402 and end port 404. A representation of such a network may then be updated according to the methods described herein.

In instances where both primary and secondary paths of a ring or subring are lost, the current state of the RPL may be used and the representation of the path through the ring or subring may indicate the fault in the current path through the ring based on the state of the RPL. Alternatively, the primary path may be shown in such instances with status indicators indicating that it and the secondary path are not functional. An alarm or other error message may also be generated and presented in a perceptible manner where both primary and secondary paths are lost. In some implementations a ring may itself be a "node" of a larger ring such that a secondary path excluding the ring is available. Accordingly, in some embodiments, upon failure, the representation of the trail path will be updated to include the secondary path and the failed ring will not be shown.

Figure 9:
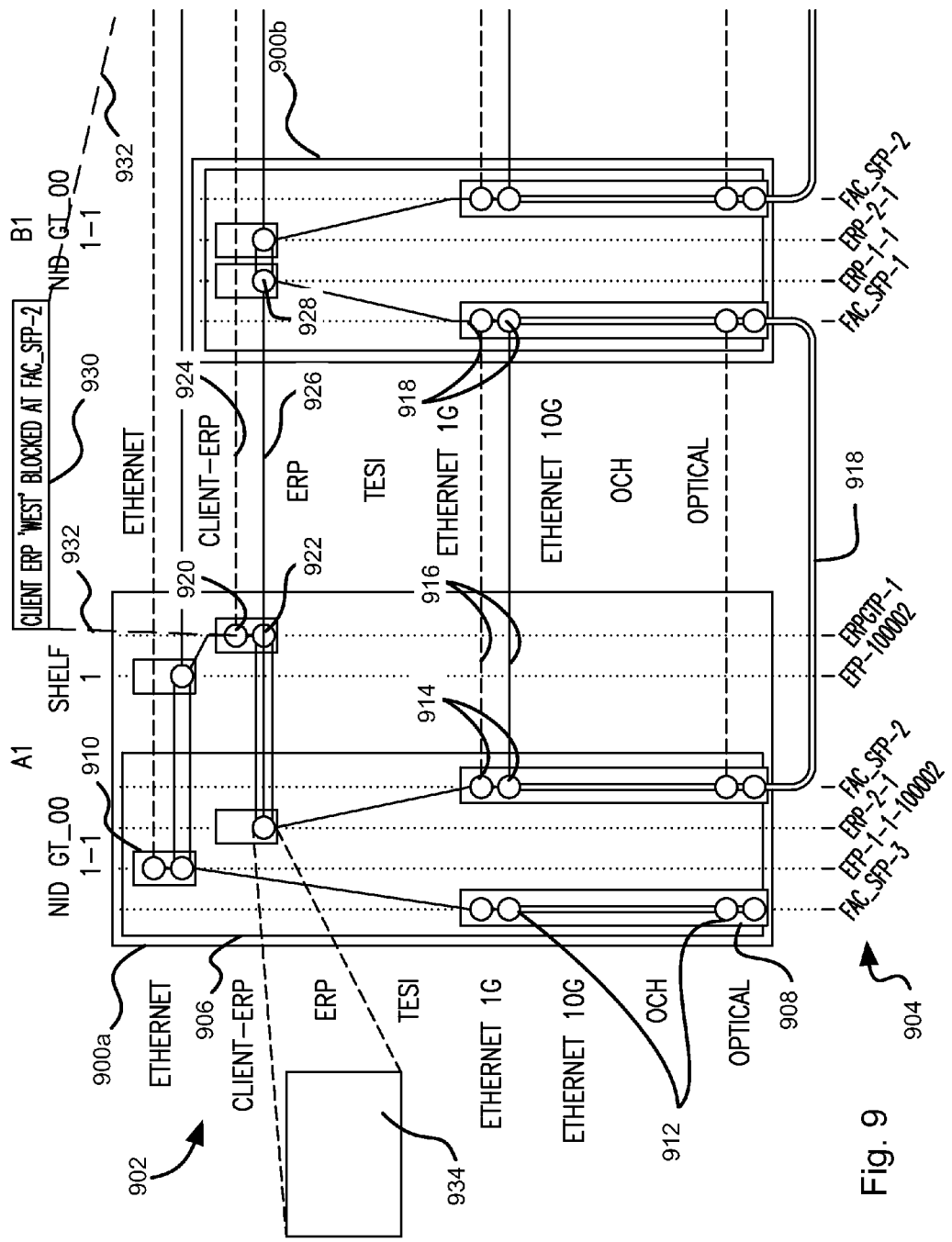
FIG. 9 is an example representation of nodes and connections between ports of nodes that may be included in a representation of a network generated in accordance with an embodiment of the invention.

FIG. 9 illustrates an example representation of a path through a network that includes one or more ERPs. In particular, a path including an ERP that is identified according to the methods described herein may be represented using some or all of the elements shown in FIG. 9.

FIG. 9 shows two nodes 900a, 900b labeled A1 and B1 both of which form part of an ERP. The nodes A1 and B1 may be two of many forming a path and/or an ERP. Other nodes and connections between nodes defining a path and/or ERP may be represented in a like manner.

The representation of FIG. 9 may include a vertical "axis" that corresponds to a protocol stack. For example, labels 902 may correspond to levels in the protocol stack and ports and links at the horizontal level of a label 902 are defined at that level in the protocol stack. The illustrated embodiment is an optical network and therefore includes an optical (e.g. physical) layer as well as layers including some or all of an OCH (optical channel), Ethernet, TESI (traffic-engineering service instance), ERPs, client ERPs (e.g. defined in the client's domain rather than a network provider).

The representation of FIG. 9 may include a horizontal "axis" that corresponds to an arrangements between components (physical and logical) implementing ports and links of a path. Accordingly, labels 904 may identify specific physical and logical components. For example "FAC_SFP-3" may refer to a specific small form-factor pluggable (SFP) transceiver of node A1. The label "EFP-1-1-100002" may refer to a logical or physical component implementing an Ethernet connection for node A1. In some embodiments labels may be of the form <shelf>-<slot>-<port>-<frequency>, or follow some other convention.

The representation of FIG. 9 may also reference physical modules of a node. For example, box 906 may reference a specific Ethernet adapter inserted into the chassis of node A1 and box 908 may represent a specific SFP transceiver within the adapter 906. In the illustrated embodiments, labels for modules are also included, such as "NID GT_00" positioned above the module labeled 904 in FIG. 9. Other boxes 910 within the node may represent logical or physical components of the adapter 906. For example, box 910 may represent a logical entity defined by the adapter 904 implementing an Ethernet port.

The circles 912 throughout the representation of FIG. 9 represent individual ports. The colors or other visual attribute of the circles 910 may indicate a status of the port, e.g. green=operational, yellow=impaired, red=blocked. The device and protocol implemented by a port 912 may be determined with reference to the labels 900 and 902 defining vertical and horizontal axes, respectively. For example, The two ports labeled 912 in FIG. 9 correspond to the ports for protocols Ethernet 1G and Optical layers by the SF "FAC_SFP-3" of node A1.

As is apparent in FIG. 9, a protocol layer may include pairs of ports 914 and pairs of links 916 at a same protocol level. For example, the Ethernet 1G layer includes such a representation. The upper links 916 and ports 914 may represent an end-to-end connection of which the upper links 916 and ports 914 are a part whereas the lower links 916 and ports 914 represent an individual link between contiguous nodes or components that form a part of the end-to-end link. As is apparent in FIG. 9, the end-to-end links 916 are dotted or otherwise visually distinguished from the contiguous links 916. As for ports, a color or other visual attribute of a link 916 may indicate a status of the link.

In some embodiments, physical lines connecting nodes may be represented by lines 918 extending between nodes 900a, 900b. The lines 918 may likewise have a color or other visual attribute that indicates the status thereof. In the illustrated embodiment, the lines 918 may represent optical fibers connecting nodes 900a, 900b.

As described herein, a trail path representation of an ERP is made possible by the methods disclosed herein. A trail path identified according to the methods described herein may be represented by a ports 920, 922 and links 924, 926. The upper link 924 and port 920 may represent and end-to-end state of the ring, e.g. a path spanning an entry point to the ring and an exit to the ring. The lower link 926 and port 922 may represent a connection between port 922 contiguous port 928 of an adjacent node or component implementing the ERP. The ports 920, 922 and links 924, 926 may have colors or visual attributes indicating the status thereof. The link 924 may indicate a status of the ERP, e.g. whether the ERP is implementing a primary path or a secondary path through the ERP. The port 920 may be connected by line 924 to some other port (not shown) that defines a current end point for the ERP.

In some embodiments, in response to one or both of a fault in the ERP or a user interaction with the link 924 in an interface, a label 930 may be displayed that indicates a status of the ERP. The label 930 may be accompanies by a lines, shading, or other visual indicator that indicates the ERP to which the label applies, such as lines 932 or shading spanning from port 920 to a corresponding other port (not shown) at an opposite end of the ERP. The label 930 may indicate the current state of the ERP (e.g. primary or secondary). In the illustrated embodiment, the label 930 indicates which port of the ERP is currently blocked, e.g. the RPL or some other port due to a fault condition.

Some or all of the representations of ports, links, nodes, or other entity represented as shown in FIG. 9 may be selectable by a user, e.g. clickable. In response to such a selection, a computer system may invoke display of a text box 934 connected to the selected entity. The text box 934 may display information concerning a status of the selected entity, such as its full name, current administrative state, graphs showing current and past resource usage, and other diagnostic information that may define a state of the selected entity as known in the art.

Figure 10:
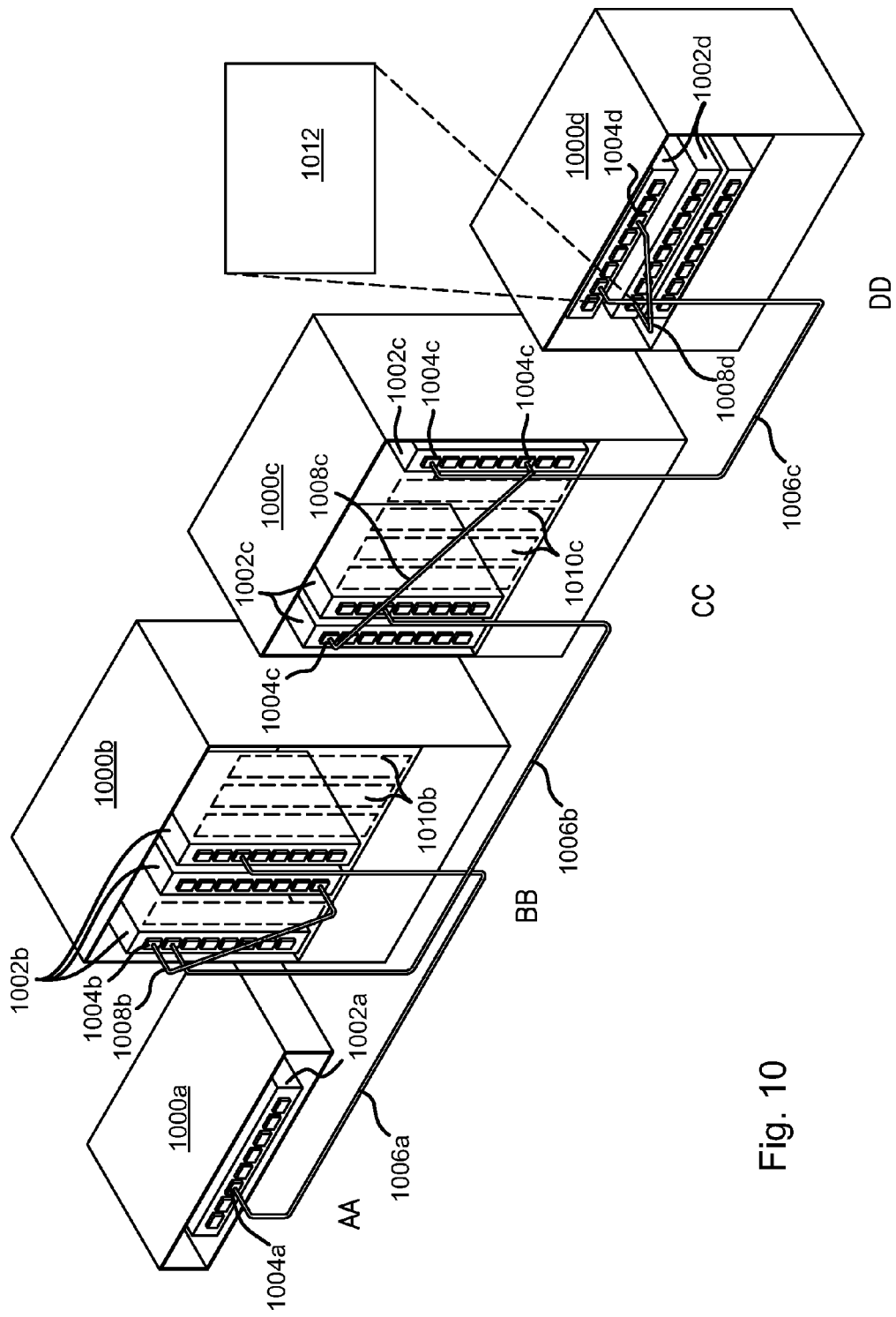
FIG. 10 is a representation of network devices that may be included in a representation of a network generated in accordance with an embodiment of the invention.

Referring to FIG. 10, the nodes of a trail may additionally or alternatively be represented by an isometric or other view of the physical components implementing nodes. For example, a plurality of nodes AA-DD may be represented by showing representations 1000a-1000d of the chassis of the nodes AA-DD, respectively. Likewise, modules 1002a-1002d (network adapters, routers, switches, etc.) mounted within the chassis may also be included. The chassis and modules may have a representation corresponding to the physical shape of the chassis and modules. The physical shape may be obtained from models of these components or other descriptions of the physical characteristics of these components.

Likewise, ports 1004a-1004d, e.g. physical ports, defined by modules 1002a-1002d may be represented and have the location and configuration of the physical embodiment of the modules 1002a-1002d. Lines 1006a-1006c coupling ports 1004a-1004d may also be represented and correspond to actual lines connecting ports 1004a-1004d of modules 1002a-1002d. Lines 1008b-1008d may also represent connections between modules mounted within the same chassis 1000a-1000d. In some embodiments, a representation of a chassis 1000a-1000d may also include representations 1010b-1010c of slots defined by the chassis 1000a-1000d, including unused slots.

Figure 11A:
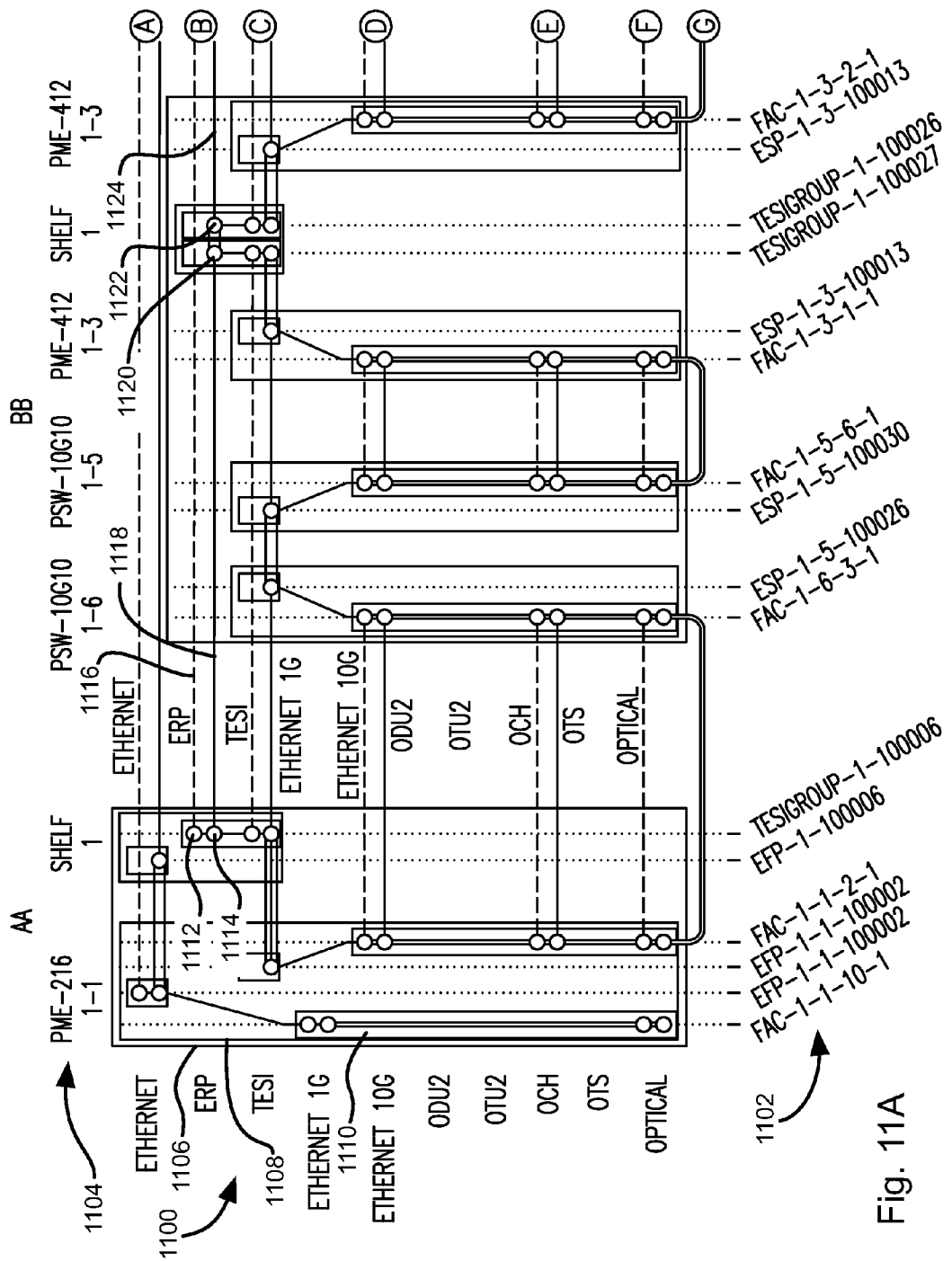
FIGS. 11A and 11B is another example representation of nodes and connections between ports of nodes that may be included in a representation of a network generated in accordance with an embodiment of the invention.
Figure 11B:
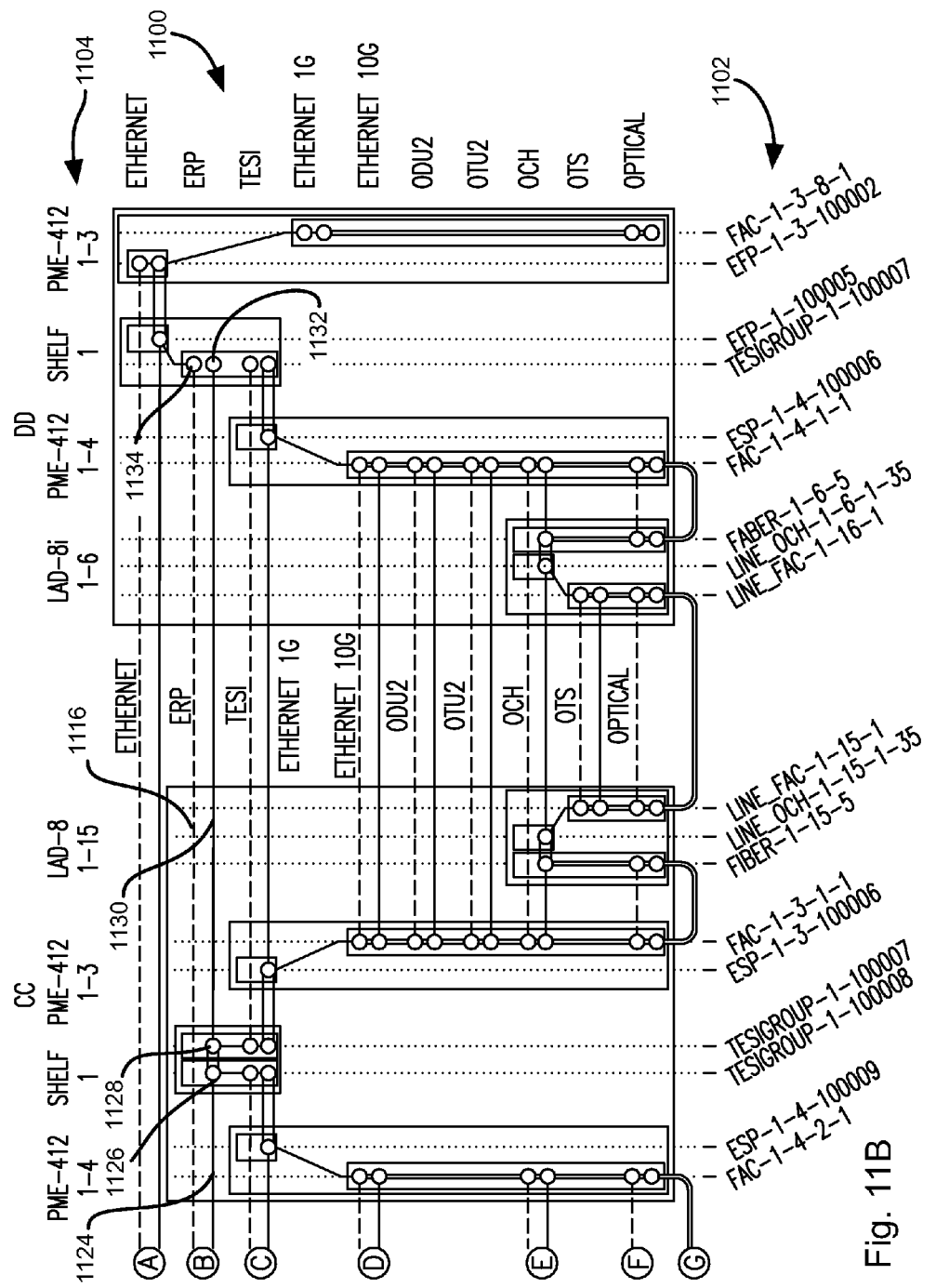

As is apparent in FIG. 10, the viewpoint of the representations of the nodes AA-DD is an isometric view. In some embodiments, a representation, such as the representation of FIGS. 11A-11B may be displayed in combination with the representation of FIG. 10. The representation shown in FIGS. 11A-11B is a planar two-dimensional view. In some embodiments, the planar representations of FIGS. 11A-11B may be rendered in a plane corresponding to the viewing angle of the representation of FIG. 9, e.g. such that the portion of the planar representation of each node AA-DD in FIG. 11A-11B is shown above the corresponding representation of that node AA-DD in the representation of FIG. 10.

Some or all of the representations of ports, links, nodes, or other entity represented as shown in FIG. 10 may be selectable by a user, e.g. clickable. In response to such a selection, a computer system may invoke display of a text box 1012 connected to the selected entity. The text box 1012 may display information concerning a status of the selected entity, such as its full name, current administrative state, graphs showing current and past resource usage, and other diagnostic information that may define a state of the selected entity as known in the art.

FIGS. 11A and 11B illustrate a representation of the devices shown in FIG. 10. As noted above, the representation of FIGS. 11A and 11B may be displayed in combination with the representation of FIG. 9. As for the representation of FIG. 9, labels 1100 along a vertical axis may indicate a level within the protocol stack and labels 1102 along the horizontal axis may indicate a module (physical or logical) implementing a given port in the protocol stack. Labels 1104 may also identify modules occupying slots within the chassis of a node. Boxes 1106 may represent a node whereas boxes 1108 positioned inside a box 1106 represent a component housed in the chassis of a node. Boxes 1110 positioned within a box 1108 may represent a physical or logical portion of a component that implements a port. Other elements of the network may be represented in the same manner as for the representation of FIG. 9.

As for the representation of FIG. 10 a plurality of nodes AA-DD are shown. In the illustrated embodiment, the nodes AA-DD define a current path through an ERP. Accordingly, node AA defines ports 1112, 1114 at the ERP protocol layer. Port 1112 may be shown connected to an end-to-end link 1116 that spans an entire ERP composed of nodes AA-DD. Port 1114 may be connected by link 1118 to a port 1120 of node BB. As is apparent in FIG. 11A, node BB does not define a port connecting to link 1116 inasmuch as this link is not the end link for the trail path through the ERP. Node BB may define an output port 1122 at the ERP level that is coupled to a link 1124 connecting port 1122 to a port 1126 of node CC. Node CC defines an output port 1128 at the ERP level that is coupled by link 1130 to port 1132 of node DD. Link 1116 is also connected to a port 1134 at the ERP level.

As for the representation of FIG. 9, ports and links may have visual attributes indicating the status thereof. Likewise, the label 930 and lines 932 may span between port 1112 and port 1134 to indicate the status of the ERP defined by nodes AA-DD.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for visualizing a network including one or more protection rings, the method comprising, by a computer system:
   receiving a selection of a start node;
   receiving a selection of an end node;
   identifying first intervening nodes between the start and end node, the intervening nodes including at least one implicated protection ring of the one or more protection rings;
   identifying a blocking port of the at least one implicated protection ring;
   identifying a path through the at least one implicated protection ring based on the identified blocking port;
   generating a first graphical representation of each node of the first intervening nodes including a representation of the at least one implicated protection ring using the identified path and excluding nodes of the at least one implicated protection ring not included in the path;
   detecting unblocking of the blocking port of the at least one implicated protection ring by subscribing to events generated by an implicated node of the at least one implicated protection ring implicated by the unblocking; and
   in response to detecting the unblocking of the blocking port, performing steps of
      identifying an updated path through the at least one implicated protection ring having an unblocked blocking port, the updated path including second intervening nodes that include at least one node not included in the first intervening nodes;
      generating an updated representation including representations of each node of the second intervening nodes including a representation of the updated path through the at least one implicated protection ring and excluding representations of nodes of the at least one implicated protection ring included in the first representation but not included in the updated path; and
      transmitting the updated representation of the intervening nodes for display.

2. The method of claim 1, wherein the updated representation includes an indicator of unblocking of the blocking port.

3. The method of claim 2, wherein the indicator of unblocking of the blocking port is an updated title.

4. The method of claim 2, wherein the indicator is a line style of a line representing the updated path through the at least one implicated protection ring.

5. The method of claim 2, wherein the indicator is one or more status indicators indicating a failure condition of one or more of the intervening nodes.

6. The method of claim 1, wherein the representation of each node of the first intervening nodes includes:
representations of the first intervening nodes and start and end nodes; and
representations of connections between the first intervening nodes and the start and end nodes.

7. The method of claim 1, wherein the representation of the each node of the first intervening nodes includes:
representations of the first intervening nodes and the start and end nodes;
representations of ports of the first intervening nodes and the start and end nodes; and
representations of connections between the ports of the first intervening nodes and the start and end nodes.

8. The method of claim 1, wherein the representation of each node of the first intervening nodes includes:
representations of the first intervening nodes and the start and end nodes;
representations of ports of the first intervening nodes for a plurality of levels of a protocol stack and the start and end nodes; and
representations of connections between the ports of the first intervening nodes for a plurality of levels of a protocol stack and the start and end nodes.

9. The method of claim 1, wherein unblocking of the blocking port is in response to detection of an error condition.

10. The method of claim 1, wherein the one or more protection rings are Ethernet Ring Protection (ERP) rings.

11. The method of claim 1, wherein:
the first graphical representations is a first three-dimensional representation of the first intervening nodes and physical connections between the first intervening nodes;
the updated representations is a second three-dimensional representation of the second intervening nodes and physical connections between the second intervening nodes.

12. A system for visualizing a network, the network including a plurality of nodes and one or more protection rings, the system being in data communication with at least one of the plurality of nodes and comprising one or more processors and one or more memory devices in data communication with the one or more processors, the one or more memory devices storing executable and operational data effective to cause the one or more processors to:
receive a selection of a start node;
receive a selection of an end node;
identify first intervening nodes between the start and end node, the intervening nodes including at least one implicated protection ring of the one or more protection rings;
identify a blocking port of the at least one implicated protection ring;
identify a path through the at least one implicated protection ring based on the identified blocking port;
generate a first graphical representation of each node of the first intervening nodes including a representation of the at least one implicated protection ring using the identified path and excluding nodes of the at least one implicated protection ring not included in the path; and detect unblocking of the blocking port of the at least one implicated protection ring by subscribing to events generated by an implicated node of the at least one implicated protection ring implicated by the unblocking;
in response to detecting the unblocking of the blocking port, cause the one or more processors to
identify an updated path through the at least one implicated protection ring having an unblocked blocking port, the updated path including second intervening nodes that includes at least one node not included in the first intervening nodes;
generate an updated representation of the second intervening nodes including a representation of the updated path through the at least one implicated protection ring and excluding representations of nodes of the at least one implicated protection ring included in the first representation but not included in the updated path; and
transmit the updated representation of the intervening nodes for display.

13. The system of claim 12, wherein:
the first graphical representations is a first three-dimensional representation of the first intervening nodes and physical connections between the first intervening nodes;
the updated representations is a second three-dimensional representation of the second intervening nodes and physical connections between the second intervening nodes.

14. The system of claim 12, wherein the updated representation includes an indicator of unblocking of the blocking port.

15. The system of claim 14, wherein the indicator of unblocking of the blocking port is an updated title.

16. The system of claim 14, wherein the indicator is a line style of a line representing the updated path through the at least one implicated protection ring.

17. The system of claim 14, wherein the indicator is one or more status indicators indicating a failure condition of one or more of the intervening nodes.

18. The system of claim 12, wherein the first graphical representation of each node of the first intervening nodes includes:
representations of the first intervening nodes and start and end nodes; and
representations of connections between the first intervening nodes and the start and end nodes.

19. The system of claim 12, wherein the graphical representation of each node of the first intervening nodes includes:
representations of the first intervening nodes and the start and end nodes;
representations of ports of the first intervening nodes for a plurality of levels of a protocol stack and the start and end nodes; and
representations of connections between the ports of the first intervening nodes for a plurality of levels of a protocol stack and the start and end nodes.

20. The system of claim 12, wherein the one or more protection rings are Ethernet Ring Protection (ERP) rings.

* * * * *